Figure 6:
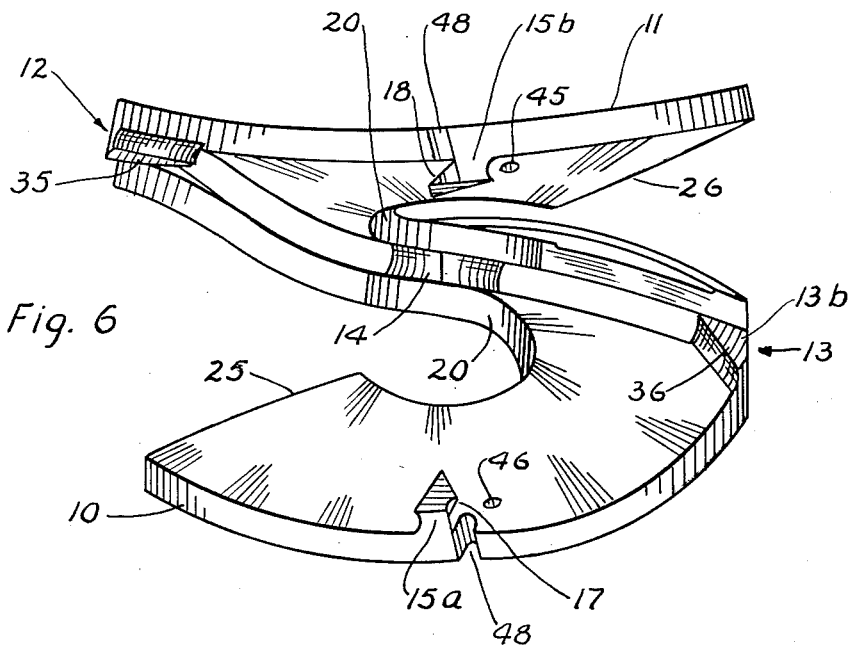

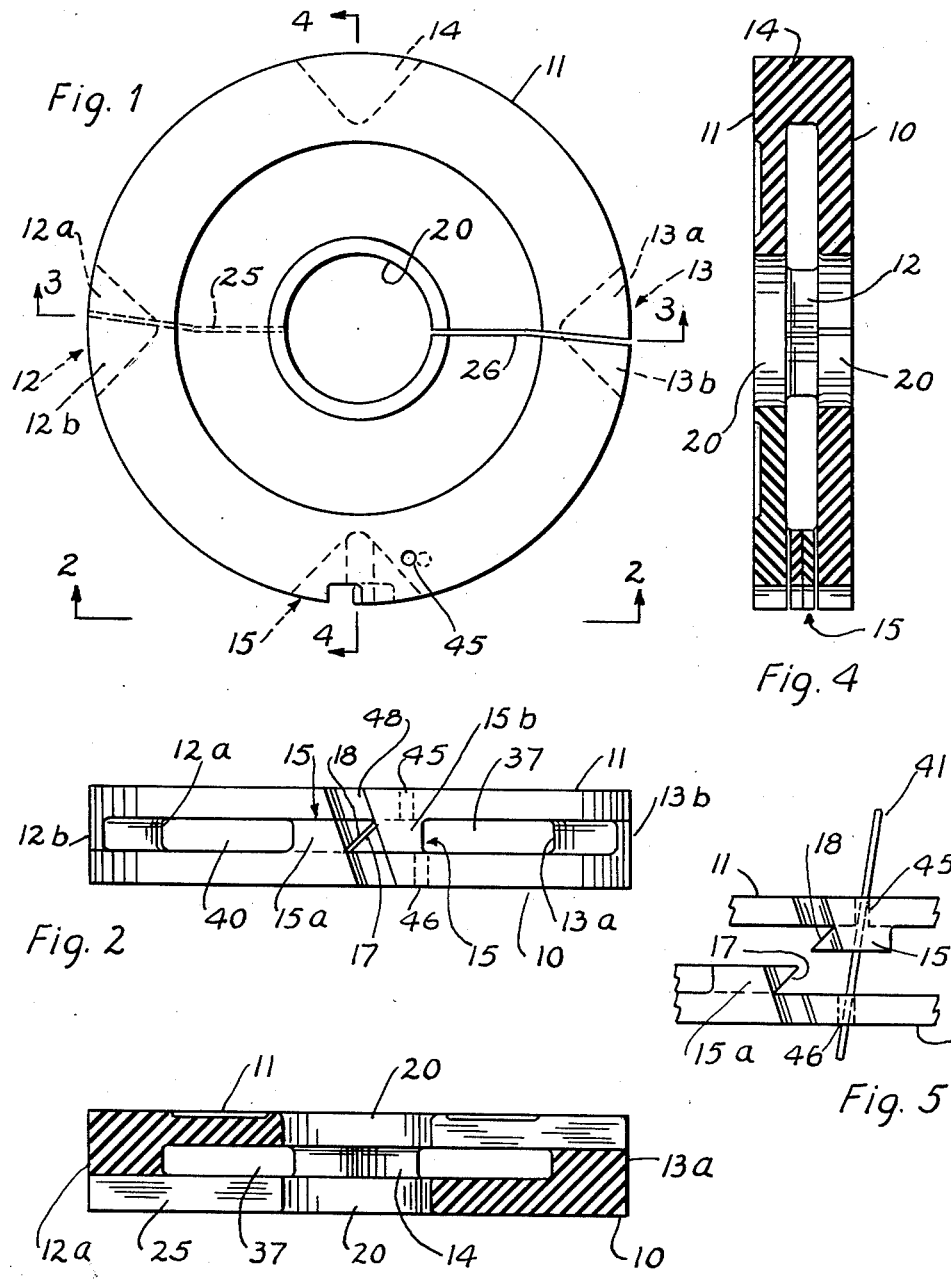

Sept. 25, 1962  B. S. MINOR  3,055,036
PIPE WIPER
Filed Feb. 21, 1961  3 Sheets-Sheet 2

INVENTOR.
BURT S. MINOR
BY Mason & Graham
ATTORNEY

Sept. 25, 1962  B. S. MINOR  3,055,036
PIPE WIPER
Filed Feb. 21, 1961  3 Sheets-Sheet 3

INVENTOR.
BURT S. MINOR
BY
ATTORNEY

United States Patent Office 3,055,036
Patented Sept. 25, 1962

3,055,036
PIPE WIPER
Burt S. Minor, La Habra, Calif., assignor to Bettis Rubber Company, Los Angeles, Calif., a corporation of California
Filed Feb. 21, 1961, Ser. No. 90,757
5 Claims. (Cl. 15—210)

This invention has to do with pipe wipers, that is to say, devices for wiping mud and the like from drill pipes as such pipes are being withdrawn from a drill hole.

In the drilling of wells, particularly oil wells, the string of drill pipe becomes coated with mud and the like and, since it is often necessary to withdraw the pipe from the well through the rotary table which forms a part of the drilling assembly, it is desirable to wipe the pipe as it is being withdrawn to prevent accumulation of mud and the like on the table as well as to facilitate handling of the pipe.

It has long been conventional to use rubber-like disks as pipe wipers, the disk having an axial pipe-passing hole of slightly less diameter than the diameter of the pipe. The disk is of large enough outside diameter to abut the rotary table as the pipe is being pulled upwardly therethrough.

To enable the wiper to pass enlarged pipe joints without damage to the wiper, it has been found desirable to radially slit the wiper disk adjacent the pipe-passing opening. And since such a slit leaves a mud streak on the pipe, it has been found desirable to use dual, superimposed wiper disks and stagger the slit in one disk relative to the slit in the other disk.

Conventionally, it has been necessary, in order to mount the wiper on a pipe, to introduce the wiper axially over the end of the pipe, which is a time consuming operation. Those working in this art have long sought to provide a pipe wiper which can be quickly applied laterally to the pipe, by providing in each of the wiper disks a slit which extends from the axial opening radially outwardly entirely through the periphery of the pipe, but this attempt has presented some serious problems.

One of those problems is that no practical means has been provided for preventing the segments of each disk from separating along the slit when in use, which separation causes the wiper to become so loose on the pipe that it ceases to perform an efficient wiping operation. Another of those problems has been that mud tends to collect and pack between the disks. Another problem has been that it is difficult temporarily to deform the disks by flexing them sufficiently to enable the pipe to be inserted laterally along the slits in the disks. Still another problem has been that, in use, the disks tend to separate axially adjacent the slits.

It is therefore an object of my present invention to provide a pipe wiper utilizing a pair of spaced superimposed wiping disks, each having a slit extending from its axial pipe-passing opening radially through its periphery, and incorporating novel means for preventing the segments of the respective disks from laterally separating along the slit when in use, as well as for retaining the disks against axial separation when in use.

Another object is to provide a pipe wiper of such construction wherein the disks are maintained separated by resilient, circumferentially spaced spacers, which not only facilitate deforming the disks to pass the pipe along the slits, but also provide peripheral mud discharging passages to release mud which otherwise would collect between the disks.

Other objects and advantages will appear hereinafter.

Figures 7, 8:
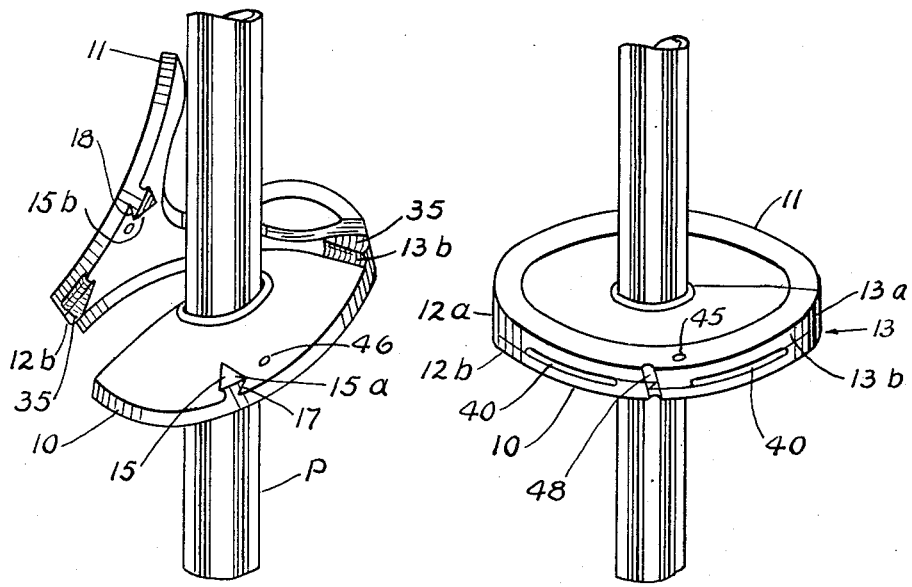
Figure 9:
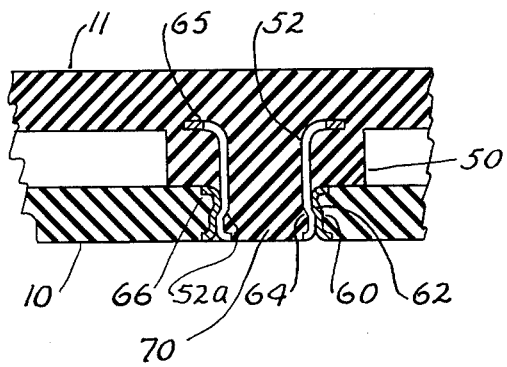
Figure 12:
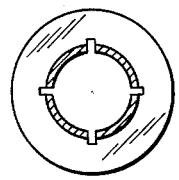
Figure 10:
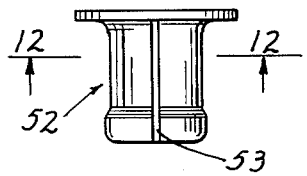
Figure 11:
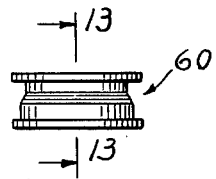
Figure 13:
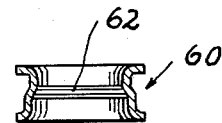
Figure 14:
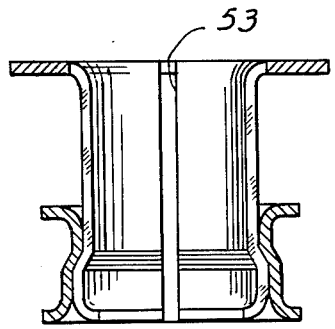

While I shall point out in the appended claims the features which I believe to be new, for the purpose of explaining how my invention may be carried into practice, I shall now describe presently preferred embodiments thereof for which purpose I shall refer to the accompanying drawing wherein:

FIG. 1 is a top plan view of my wiper;
FIG. 2 is a side elevation taken on line 2—2 of FIG. 1;
FIG. 3 is a section taken on line 3—3 of FIG. 1;
FIG. 4 is a section taken on line 4—4 of FIG. 1;
FIG. 5 is a fragmentary side elevational view;
FIG. 6 is a perspective view showing how my wiper may be temporarily deformed or flexed while laterally installing it on a drill pipe;
FIG. 7 is a perspective view showing my wiper in course of being applied to a drill pipe;
FIG. 8 is a perspective view showing my wiper installed on a drill pipe;
FIG. 9 is an enlarged sectional view showing a modification of my invention;
FIG. 10 is a side elevation showing a fastener element used in my invention;
FIG. 11 is a side elevational view of a fastener element which is engaged by the element of FIG. 10;
FIG. 12 is a cross sectional view taken on line 12—12 of FIG. 10;
FIG. 13 is a section taken on line 13—13 of FIG. 11; and
FIG. 14 is an enlarged sectional view of the cooperating fastener elements.

While my pipe wiper is a one-piece body molded of elastic rubber-like material, it may be described as comprising a pair of resilient rubber-like, parallel disks 10, 11 spaced apart in superimposed relationship by resilient rubber-like spacers or blocks 12, 13, 14 and 15.

Spacer 15 is comprised of two interengaging portions, 15a, 15b. Portion 15a is formed integral with disk 10 and has an undercut 17, while portion 15b is formed integral with disk 11 and has an opposed undercut 18. Said undercut portions interengage (as shown in FIG. 2) for the purpose to be described.

Spacer 12 has a portion 12a formed integral with both disks and has a contiguous portion 12b which is formed integral with disk 11 but is unattached to disk 10, for the purpose to be described.

Spacer 13 has a portion 13a formed integral with both disks and has a portion 13b which is formed integral with disk 10 but is unattached to disk 11.

Spacer 14 is formed integral with both disks 10 and 11.

Each of the spacers, when considered in plan section and considered as a whole, is triangular in shape with its apex disposed towards the longitudinal axes of the disks.

Each of the disks 10, 11 has a central pipe-passing hole 20 which is of slightly smaller diameter than the outside diameter of the pipe which it is to pass.

Disk 10 has a radial slit 25 which intersects both the hole 20 and the periphery of the disk. Portion 12b of spacer 12 overlies and forms an abutment surface 35 to be engaged by the underlying portion of the disk 10 adjacent slit 25.

Disk 11 has a like radial slit 26 which also intersects both the hole 20 and the periphery of the disk. Portion 13b of spacer 13 underlies and forms an abutment surface 36 for the overlying portion of disk 11 adjacent the slit 26.

By thus spacing the disks apart, a space or mud chamber 37 is defined therebetween to receive mud wiped from an upwardly moving pipe P by the top disk 11, and the spaces between the spacers define peripheral escape passageways 40 through which mud is discharged from the chamber.

The significance of the structural features hereinabove described will be better understood from the following description of the way in which the wiper is applied to and used upon a drill pipe P.

As best shown in FIGS. 6–8, in order to install my wiper upon a pipe, the user, by use of his hands or any suitable spreading tool, pulls downwardly on the lower disk 10 adjacent the slit 25 and pulls upwardly on the upper disk 11 until the segments of the disk 10 are sufficiently separated to insert the pipe laterally along the slit 25 into the axial hole 20. After the pipe is thus engaged in the hole 20 of the lower disk, the same general operation is repeated to deform the upper disk 11 along the slit 26 to enable the pipe to be inserted. The elastic rubber-like spacers by which the disks are connected together add flexibility to the wiper which facilitates deforming the disks in the manner shown in FIGS. 6 and 7. As best shown in FIG. 7, it is usually desirable, in carrying out the installing operation, to somewhat rock the wiper about the pipe.

After the wiper is thus installed on the pipe, the undercuts 17, 18 of spacer 15 are interengaged, thus preventing the slits from widening and preventing the disks from separating axially during use. To thus interengage the undercuts 17 and 18, or to disengage them, a suitable tool or rod 41 may be inserted through the holes 45, 46 provided through the disks (FIG. 5), and may be so manipulated as to relatively flex the disks circumferentially to an extent necessary to interengage or disengage the undercuts. The resiliency of the material of the wiper will maintain the undercuts in interengaged position.

As a second or additional means for mechanically flexing the disks in order to interengage or disengage the undercut portions of spacer 15, I may provide registering diagonal slots 48 in the peripheries of the disks at spacer 15, to receive a suitable tool, such as the member 41.

A modified means for retaining the disks against axial separation and for preventing the disk segments from separating along the slits when in use is shown in FIGS. 9–14.

Here, in lieu of the interengaging of the undercut portions of spacer 15, before described, I mold integral with disk 11 a spacer 50 and embed in said disk during the molding a somewhat cylindrical resilient, metallic grommet-like fastener element 52 having longitudinal slits 53 spaced apart 90°. The member 52 is filled with elastic rubber-like material of the wiper during the molding operation, so that the filling 70 of rubber-like material yieldably resists inward flexing of the side wall of the fastener 52. A portion 52a of member 52 projects beyond the plane of the bottom of the spacer 50. In the portion of the disk 10 which abuts the spacer 50, I embed a metal sleeve or fastener element 60 which presents an annular shoulder 62 which lockingly engages the annular shoulder 64 of the member 52 when the two are interengaged as shown in FIGS. 9 and 14. The flanged inner end 65 of member 52 prevents the latter member from pulling out of the wiper, and the flanged end 66 of member 60 prevents the latter from pulling out of the wiper, while the rubber filling 70 in the member 52 strengthens the yieldable resistance to disengaging the shoulders 62, 64.

I claim:

1. A pipe wiper capable of being laterally installed on and removed from a drill pipe, comprising:
 (a) a pair of superimposed, spaced, elastomeric disks each having an axial pipe-passing opening and a slit extending radially outwardly from its said axial opening through its periphery, the slit in one of said disks being circumferentially offset from the slit in the other disk substantially 180°;
 (b) a pair of elastomeric spacer blocks disposed between said disks at the outer ends of said respective slits;
 (c) one of said blocks having a portion formed integral with both said disks at one side of one of said slits and having an adjoining slit-spanning portion unattached to but having abutting engagement with one of said disks; and
 (d) the other of said blocks having a portion formed integral with both said disks at one side of the other of said slits and having an adjoining slit-spanning portion unattached to but having abutting engagement with the other of said disks.

2. The pipe wiper of claim 1 which additionally includes a third spacer block disposed between peripheral portions of said disk intermediate said first mentioned blocks and formed integral with both said blocks.

3. The pipe wiper of claim 1 which additionally includes interengaging fastener means disposed between peripheral portions of said disks intermediate said first mentioned blocks.

4. The pipe wiper of claim 1 which additionally includes:
 (a) fastener means for retaining portions of said disks against separative movement and wherein the first of said disks has an opening therethrough;
 (b) a sleeve-like metallic fastener element secured in the last mentioned opening;
 (c) a boss formed integral with the other of said disks and having a reduced diameter portion projecting into said last mentioned opening; and
 (d) a substantially cylindrical, resilient, longitudinally split, grommet-like fastener element emebedded in said boss and having an enlarged diameter portion resiliently lockably engageable in said sleeve-like fastener element.

5. A pipe wiper capable of being laterally installed on and removed from a drill pipe, comprising:
 (a) a pair of superimposed, spaced, elastomeric disks each having an axial pipe-passing opening and a slit extending radially outwardly from its said axial opening through its periphery, the slit in one of said disks being circumferentially offset from the slit in the other disk substantially 180°;
 (b) spacer means disposed between peripheral regions of said disks at the outer end portion of each of said slits;
 (c) each of said spacer means including a first elastomeric spacer block formed integral with both disks at one side of the slit and a second elastomeric spacer block attached to only one of the disks and being unattached to but having abutting engagement with the other disk at the other side of said slit;
 (d) said spacer means being spaced apart circumferentially of said disks whereby to provide peripheral outlet passages therebetween.

References Cited in the file of this patent
UNITED STATES PATENTS
2,880,440 Shipley _____ Apr. 7, 1959
2,928,114 Ballard _____ Mar. 15, 1960